United States Patent [19]

Buchmann

[11] 4,257,291
[45] Mar. 24, 1981

[54] APPARATUS FOR MAKING HOLES IN MOVING CARDS OR THE LIKE

[75] Inventor: Hans Buchmann, Oetwil, Switzerland

[73] Assignee: Zühlke Engineering AG, Schlieren, Switzerland

[21] Appl. No.: 24,010

[22] Filed: Mar. 26, 1979

[30] Foreign Application Priority Data

Mar. 31, 1978 [CH] Switzerland ............... 3457789/78

[51] Int. Cl.³ .................................................. G06K 1/05
[52] U.S. Cl. .......................................... 83/71; 83/285; 83/314; 83/315; 83/572; 234/35; 234/50
[58] Field of Search ............... 83/71, 284, 285, 314, 83/315, 316, 572; 234/50, 49, 35–37

[56] References Cited

U.S. PATENT DOCUMENTS

| 2,761,508 | 9/1956 | Goff .................................. 234/50 |
| 2,951,534 | 9/1960 | Woodbury et al. ............... 234/50 |
| 3,211,370 | 10/1965 | Hergert ............................ 234/50 |
| 3,667,669 | 6/1972 | Nagata ......................... 234/35 X |
| 3,890,488 | 6/1975 | Lee et al. ..................... 234/37 X |

FOREIGN PATENT DOCUMENTS 148136  9/1931 Switzerland ........................... 83/316

Primary Examiner—J. M. Meister
Attorney, Agent, or Firm—Peter K. Kontler

[57] ABSTRACT

A dispenser for cards which are withdrawn by customers at the entrance of a parking lot has a housing for a supply of coherent cards which are transported seriatim by advancing rolls toward an outlet opening for withdrawal by customers. On its way toward the outlet opening, each card is provided with legible information by a matrix printer which can apply such information in response to a signal from a computer while the card is in motion. The thus imprinted card then advances between the matrix and the perforating tool of a punching apparatus which applies one or more holes while the card is in motion. The matrix and the tool are mounted on a plate which is secured to a fixed bracket by a first parallel motion mechanism so that it can move in and counter to the direction of movement of the card between the tool and the martrix. The plate is pivotable about a fixed axis by an oscillating crank gear so that the tool moves along an arcuate path to which the adjacent card is tangential. During each movement in the direction of transport of cards, the tool and the matrix move, for a certain interval of time, at the exact speed of the card. At such time, a cam moves the tool toward the matrix so that the tool perforates the card portion whicn is located between the matrix and the tool. The motor which causes the cam to move the tool toward the matrix receives commands from the computer.

19 Claims, 6 Drawing Figures

APPARATUS FOR MAKING HOLES IN MOVING CARDS OR THE LIKE

CROSS-REFERENCE TO RELATED APPLICATION

The apparatus of the present invention can apply encoded information to sheet-like carriers of the type disclosed in commonly owned copending application Ser. No. 22,317 filed Mar. 20, 1979 by Hans Buchmann for "Method and apparatus for preparing and processing receipts for customers of parking lots or the like".

BACKGROUND OF THE INVENTION

The present invention relates to apparatus for applying information to webs, sheets or cards, and more particularly to improvements in apparatus of the type wherein a ram or an analogous tool is movable with respect to a matrix or vice versa in order to apply information to a sheet-like information carrier which is placed therebetween.

It is already known to automatically issue a ticket (e.g., a punched card) to a customer who is about to drive his or her vehicle into a parking lot, especially into a self-service parking lot. The ticket is withdrawn from the slot of a dispenser whereby such withdrawal results in the transmission of a signal which causes the toll bar or ramp at the entrance to move to its inoperative position, i.e., the vehicle can be driven into the parking lot. The ticket contains information which is often encoded in binary form and denotes the date of parking and the time of the day. The information can be decoded by an automatic reader at the time the customer desires to remove his or her vehicle from the parking lot. Furthermore, the ticket can contain information which is not encoded (i.e., information which can be deciphered or perused by the customer) and normally denotes the day of parking and the time of the day.

The dispenser from which the tickets are withdrawn by customers contains or cooperates with means for applying to the ticket suitable information, e.g., with a printer or writer and a punching or stamping apparatus. The ram of the punching apparatus is guided in stationary ways, i.e., the ticket which is to be withdrawn must advance in stepwise fashion so that it is at a standstill when the ram is moved toward the matrix of the punching apparatus. As a rule, the ram cooperates with the matrix to encode information in the form of perforations.

A drawback of the just discussed dispensers is that they cannot employ continuously operated printers or writers, i.e., the printer or writer must also constitute an intermittently operated information applying device.

OBJECTS AND SUMMARY OF THE INVENTION

An object of the invention is to provide a novel and improved stamping or punching apparatus which can apply perforations or other type of information to a moving carrier, particularly to a sheet-like article in the form of a ticket or card.

Another object of the invention is to provide a stamping or punching apparatus which can apply information in binary code or the like while the carrier to which the information is to be applied is in motion.

A further object of the invention is to provide a dispenser for carriers of information which embodies or is combined with the improved apparatus.

An additional object of the invention is to provide the apparatus with novel and improved means for holding, moving and otherwise displacing the perforating tool with and relative to the associated matrix.

The invention resides in the provision of an apparatus for making holes in a sheet-like carrier of information (e.g., a card which can be used as a ticket to be handed to a customer of a parking lot). The apparatus comprises means for transporting the carrier at a predetermined speed and in a predetermined direction along a preferably straight first path, a maxtrix which is disposed at one side of the path, a punching or perforating tool which is disposed at the other side of the path opposite the matrix, a plate-like member or analogous holder means for the matrix and the tool, means for moving the holder means with the tool and matrix in and counter to the predetermined direction along an arcuate path (to which the first path is tangential) and at a varying speed so that, during a predetermined interval of movement of the holder means in the predetermined direction, the speed of the tool and matrix matches or closely approximates the predetermined speed of the carrier in the first path, and means for shifting the tool substantially at right angles to the predetermined direction toward the matrix to thereby perforate the carrier portion between the matrix and the tool during selected intervals of movement of the holder means in the predetermined direction.

The perforating apparatus can be installed in a dispenser which contains a source of interconnected but separable carriers and wherein the aforementioned transporting means advances successive carriers toward an outlet opening so that the foremost carrier can be withdrawn by a customer. The dispenser contains a computer which transmits signals to the shifting means of the perforating apparatus and which also controls the operation of a matrix printer or analogous means for applying legible information to successive carriers while such carriers move along the first path. The computer further controls the transporting means and the printer.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
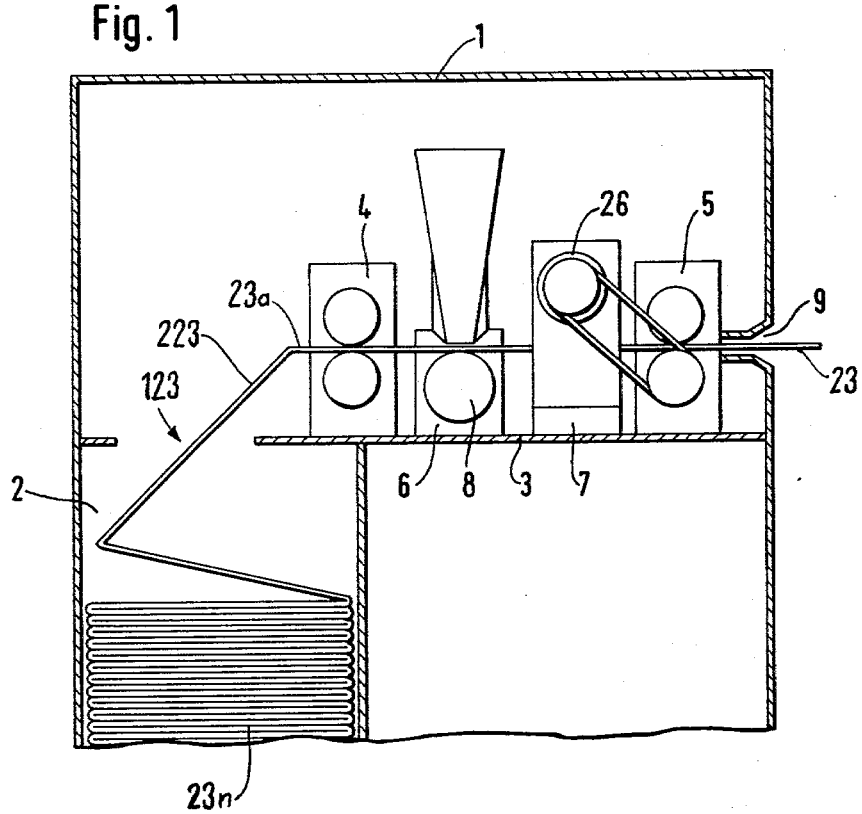
FIG. 1 is a schematic longitudinal vertical sectional view of a dispenser which embodies the improved punching apparatus.

Referring first to FIG. 1, there is shown a dispenser for information carriers in the form of tickets or cards 23 which can be withdrawn by customers of parking lots or the like. The dispenser comprises a housing 1 with a magazine 2 which constitutes a source of supply of interconnected neutral cards 23, 23a . . . 23n. The cards are stacked in Leporello fashion (zig-zag formation). A bottom wall or platform 3 in the housing 1 supports a transporting unit including two pairs 4 and 5 of advancing rolls. The platform 3 further supports a writer or printer 6 of any known design and a punching apparatus 7 which is constructed and assembled in accordance with the invention. The printer 6 may be a commercially available device for the application of legible information, e.g., a matrix printer of the type marketed by Victor Comptometer Corp., 3900 North Rockwell Street, Chicago, Illinois 60618. The moving parts of the transporting unit 4, 5, of the printer 6 and of the stamping device 7 receive motion from a common prime mover 26, e.g., an electric motor. This motor transmits torque to at least one roll of the pair 4 of advancing rolls, to at least one roll of the pair 5 of advancing rolls, and to a rotary drum 8 of the printer 6. The manner in which the motor 26 drives the pair 4 of advancing rolls and the drum 8 is not specifically shown in the drawing.

When the motor 26 is on, it causes the pairs 4 and 5 of advancing rolls to transport the foremost card 23 of the supply or stack 123 in the magazine 2 toward an outlet opening 9 of the housing 1 so that the foremost card 23 can be withdrawn by a customer. Such actuation of the motor 26 is normally initiated by the oncoming vehicle which actuates a switch (e.g., a switch actuatable by a depressible threshold 10, shown in FIG. 2, over which the vehicle is driven in the lane which leads to the entrance of a parking lot). The depressed threshold 10 causes the switch to transmit a signal to a processing or control circuit 11 (also shown in FIG. 2), and this circuit (e.g., a commercially available minicomputer) transmits an appropriate signal to the motor 26 to start the pairs 4 and 5 of advancing rolls in a direction to move the foremost card 23 toward and into the outlet opening 9. The rolls of the first pair 4 advance the foremost card 23 through the printer 6 and thereupon through the punching apparatus 7. The printer 6 applies legible information which can be read by the customer, and the apparatus 7 applies information which can be decoded by an automatic reader. The foremost card 23 is arrested when its leader can be readily grasped by hand so that a customer can withdraw the foremost card and thereby separates such card from the next-following card 23a by breaking the bond along a line 223 of perforations between the foremost and next-following cards. If the cards are stored in the form of a roll, the housing 1 of the dispenser contains or may contain a suitable severing device (e.g., shears, not shown) which separates the foremost card 23 from the next-following card 23a as soon as the forward transport of the foremost card 23 is completed. The severing device receives appropriate actuating signals from the control circuit 11. The line 223 need not be formed by perforations; all that counts is to weaken the continuous file of cards 23 . . . 23n between each pair of neighboring cards so that the foremost card can be readily detached from the card 23a when it extends from the housing 1.

The punching apparatus 7 comprises a support here shown as a bracket 12 which is fixedly secured to the platform 3 (see FIG. 3) and whose upper end portion carries a bearing 13 for a horizontal shaft 24. The upwardly extending portion or leg of the bracket 12 is parallel with a plate-like member 14 which is coupled to the bracket 23 by a parallel motion mechanism including spaced-apart parallel arms 15 and 16. The arms 15 and 16 resemble or constitute rectangular frames and consist of a resilient (springy) material, such as spring steel. The left-hand end portions of the arms 15 and 16 (as viewed in FIG. 3) are fixedly secured to the bracket 12, and the right-hand end portions of these arms are affixed to the member 14 (hereinafter called plate). The plate 14 constitutes a holder means for a matrix 17 which is provided with a socket or hole 18.

Figure 3:
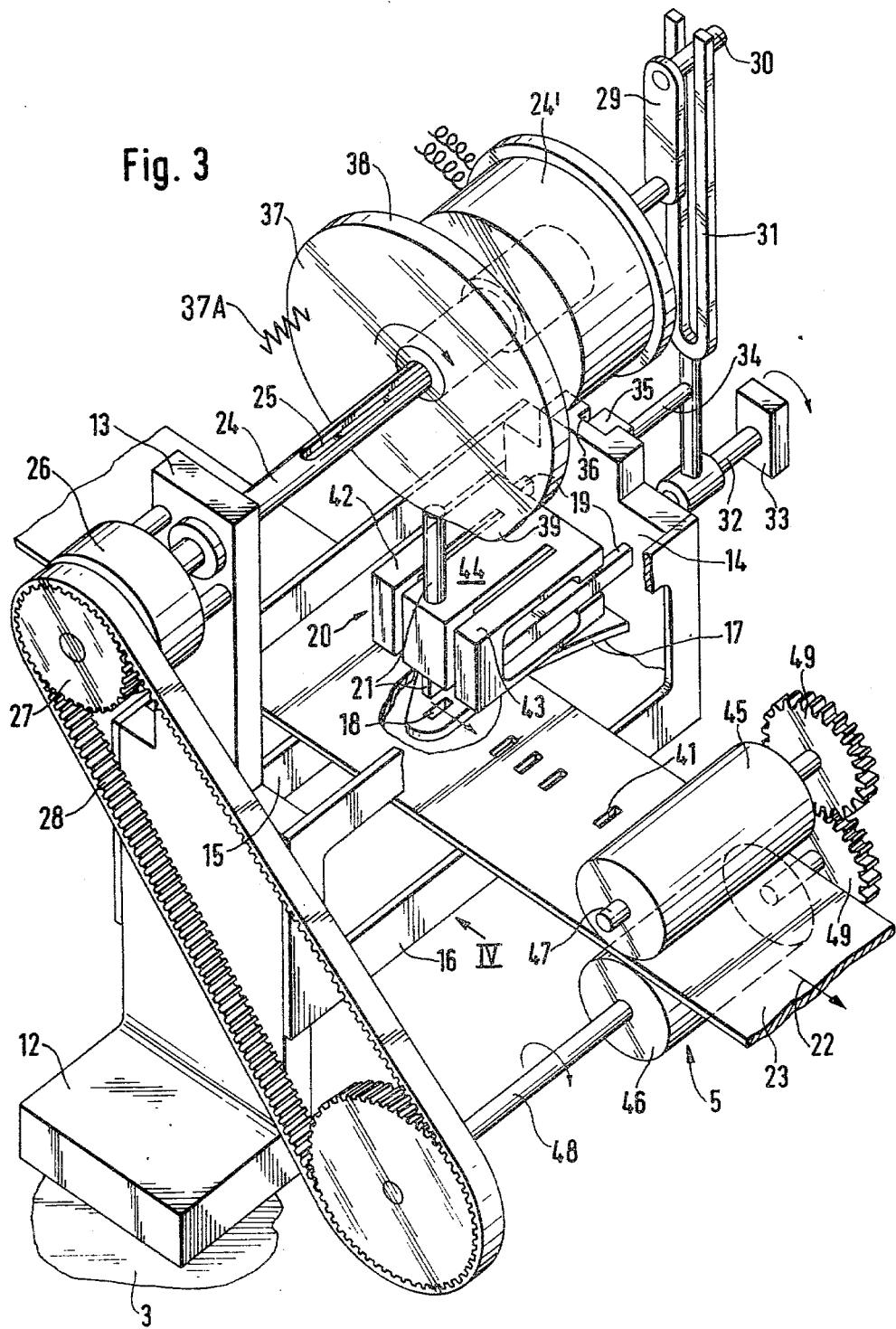
FIG. 3 is a perspective view of the punching apparatus.

The plate 14 further supports a second (twin) parallel motion mechanism 20 which is installed at a level above the matrix 17 between the arms 15, 16 and is attached to the plate 14 by bolts 19 or analogous fastener means. The mechanism 20 carries a perforating tool or ram 21 which is in permanent axial alignment with the socket 18. FIG. 3 shows the tool 21 in retracted or idle position. The clearance between the tool 21 and the matrix 17 is then wide enough to constitute a portion of the straight horizontal path (indicated by arrow 22) for the foremost card 23.

The shaft 24 is rotatable in the bearing 13 and has an elongated groove 25 for a complementary key of a disk-shaped actuating element or cam 37. The left-hand end portion of the shaft 24 extends forwardly beyond the bearing 13 and receives torque from the motor 26 which is mounted on the bracket 12. The output element of the motor 26 further carries a pulley or sprocket wheel 27 for a toothed belt 28 which drives the advancing rolls 45, 46 of the pair 5.

The rear end portion (as viewed in FIG. 3) of the shaft 24 is connected with a crank arm 29 having a crank pin 30 which extends into the bifurcated portion of a component 31 of a crank and rocker mechanism. The component 31 is pivotable on a pin 32 which is installed in a stationary bearing block 33. A pin-shaped protuberance or post 34 which extends laterally from the component 31 carries a wiper 35 extending into vertical ways 36 at the outer side of the plate 14. When the shaft 24 rotates, the component 31 pivots about the axis of the pin 32 and transmits reciprocatory movements to the plate 14. The tool 21 shares the movements of the plate 14 and is simultaneously guided by the parallel motion mechanism 15, 16 so that it travels along a portion of a circular second path whose radius is determined by the length of the arms 15 and 16. The straight path of movement of the foremost card 23 (arrow 22) is tangential to the arcuate path of movement of the tool 21.

The mechanism 20 enables the tool 21 to move up and down, i.e., the direction of its axis. The means for shifting the tool 21 axially downwardly comprises the aforementioned disk-shaped cam 37 which is keyed to the shaft 24 and whose peripheral surface (cam face) 38 can engage the upper end of the tool 21. The cam face 38 is coaxial with the shaft 24 save for the provision of a protuberance or lobe 39. The cam 37 is movable axially of the shaft 24 between an operative position which is shown in FIG. 3 and a second or inoperative position in which the cam face 38 is remote from the tool 21. When the cam 37 assumes the operative position, the upper end of the tool 21 is yieldably urged against the cam face 38 and descends as soon as it is engaged by the lobe 39. The means for biasing the tool 21 upwardly forms part of or is constituted by the mechanism 20.

The means for moving the cam 37 axially of the shaft 24 to and from the operative position of FIG. 3 comprises an electromagnet 24' which is coaxial with the shaft 24. When the electromagnet 24' is energized, it moves the cam 37 from the inoperative position against the opposition of suitable biasing means (e.g., a spring 37A which is shown schematically in FIG. 3) so that the cam face 38 moves into register with the tool 21 and the latter is depressed by the lobe 39 before or not later than when the shaft 24 completes a full revolution. When the electromagnet 24' is deenergized, the spring 37A moves the cam 37 axially of the shaft 24 and away from the tool 21.

Figure 2:
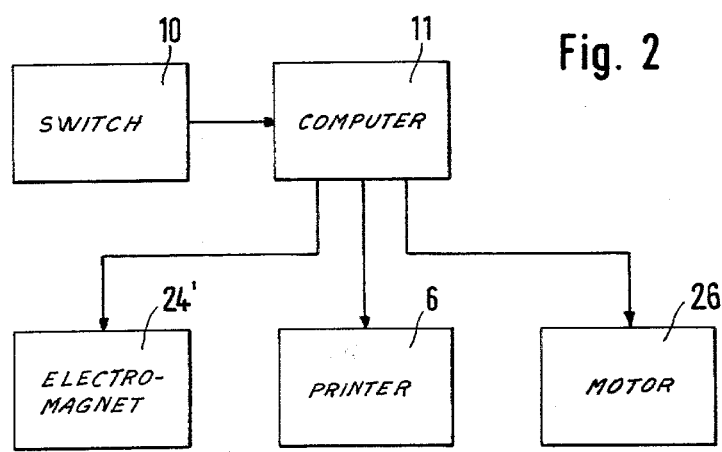
FIG. 2 is a circuit diagram of the dispenser of FIG. 1.

The circuit 11 of FIG. 2 controls the condition of the electromagnet 24' in such a way that the tool 21 is moved downwardly when the card 23 between the tool and the matrix 17 is to be formed with a perforation (bit of information) 41.

Figure 4:
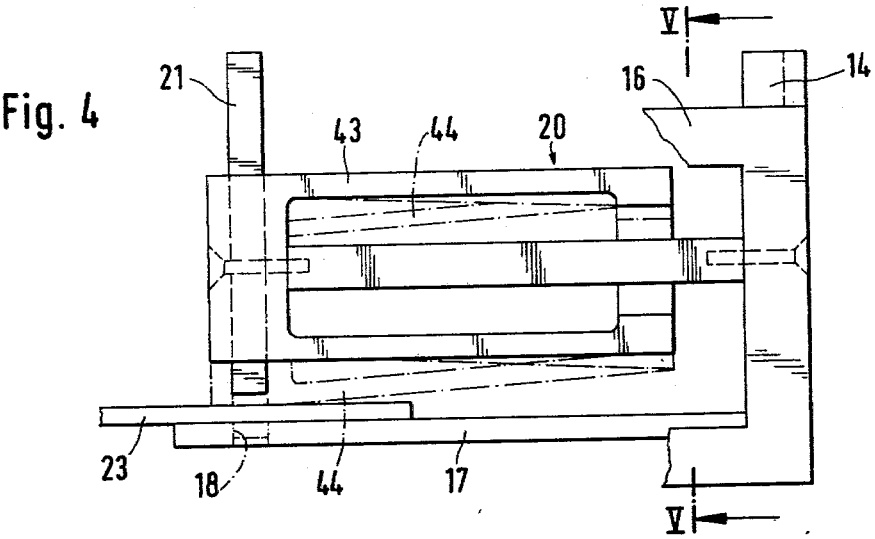
FIG. 4 is an enlarged fragmentary side elevational view of a detail of the punching apparatus as seen in the direction of arrow IV in FIG. 3.
Figure 5:
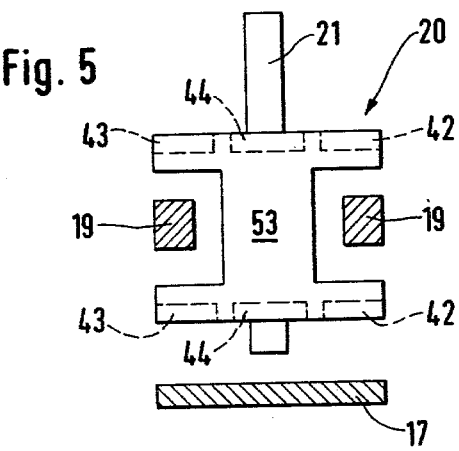
FIG. 5 is a sectional view as seen in the direction of arrows from the line V—V of FIG. 4.

FIGS. 3 to 5 illustrate the details of the twin parallel motion mechanism 20. This mechanism comprises two outer arms 42, 43 which flank a centrally located (first) arm 44. The tool 21 is connected with the free end portion of the arm 44. The other end portion of the arm 44 is fixedly coupled with the outer arms 42, 43 by a twin tee 53. Those end portions of the outer arms 42, 43 which are adjacent to the tool 21 are fixedly secured to the plate 14 by the aforementioned fasterner means 19. The arms 42-44 consist of springy material and can be integral with the twin tee 53. When the lobe 39 engages the tool 21 (the corresponding position of the lower end portion of the tool is shown in FIG. 4 by phantom lines), the twin tee 53 moves downwardly through a distance which equals half the stroke of the tool 21 and transmits motion to the outer arms 42 and 43. The twin tee 53 further compensates for elastic deformation and resultant shortening of the arms 42-44 so that the tool 21 is compelled to move axially. The arm 44 guides the tool 21 during each movement toward or away from the maxtrix 17.

As shown in FIG. 3 the rolls 45 and 46 of the pair 5 are respectively affixed to shafts 47 and 48. The shaft 48 is driven by the belt 28 and drives the shaft 47 by way of a gear train 49. The shaft 48 also transmits torque to the rolls of the pair 4 in a manner which is not shown in the drawing.

Figure 6:
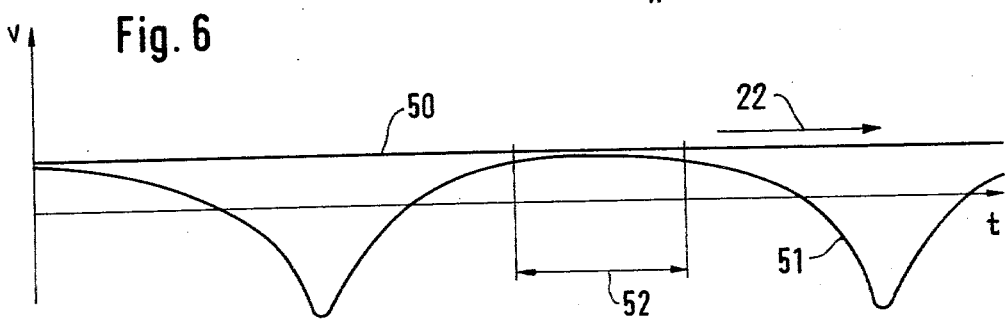
FIG. 6 is a diagram showing the relationship of the speeds of the carrier and the punching or perforating tool.

Reciprocatory movements of the tool 21 and matrix 17 (plate 14) under the action of the crank and rocker mechanism including the component 31 are synchronized with lengthwise movement of the card 23 under the action of the rolls 45 and 46 in such a way that, whenever the tool 21 moves in the direction of arrow 21, its speed matches or very closely approximates (for a certain interval which suffices to make a perforation 41) the speed of the card 23. In FIG. 6, the speed v of the card 23 is measured along the ordinate, and the time t is measured along the abscissa. A straight line 50 denotes the constant (predetermined) speed of the card 23 in the direction indicated by the arrow 22; such speed is imparted by the rolls 45 and 46. A curve 51 denotes the speed of the tool 21 and matrix 17 in response to oscillatory movements which are imparted to the plate 14 by the component 31 of the crank and rocker mechanism.

It will be noted that, during each phase when the direction of movement of the tool 21 is the same as the direction which is indicated by the arrow 22, there is an interval (52) when the speed of the tool 21 matches or very closely approximates the speed of the card 23. It is during such interval (52), that the lobe 39 of the cam 37 causes the tool 21 to move downwardly and to make a hole 41 in the card 23 which is located between the tool 21 and the matrix 17. The tool 21 is withdrawn to a level above the path for the card 23 prior to elapse of the respective interval 52. This insures that the tool 21 can make a clean cut, i.e., that the surfaces surrounding a hole 41 are smooth and cannot interfere with rapid decoding of the information which is represented by a row of holes 41. The signals for energization and deenergization of the electromagnet 24' and for starting or arresting the motor 26 are transmitted by the circuit 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. Apparatus for making holes in a sheet-like carrier of information, comprising means for transporting the carrier at a predetermined speed and in a predetermined direction along a first path; a matrix disposed at one side of said path; a perforating tool disposed at the other side of said path opposite said matrix; holder means for said tool and said matrix; means for moving said holder means with said tool and said matrix in and counter to said direction along an acruate second path which is so oriented relative to said first path that said tool and said matrix move along trajectories which maintain their respective distances from the carrier transported in the first path, and at a varying speed so that, during a predetermined interval of movement of said holder means in said direction, the speed of said tool and said matrix at least closely approximates said predetermined speed; and means for shifting said tool substantially at right angles to its trajectory and to said direction toward said matrix to thereby perforate the carrier portion between said matrix and said tool during selected intervals of movement of said holder means in said direction.

2. The apparatus of claim 1, wherein said moving means includes means for guiding said tool during shifting substantially at right angles to said direction.

3. The apparatus of claim 1, wherein said holder means comprises a substantially plate-like member and further comprising a stationary support and a parallel motion mechanism connecting said member to said support so that said member is movable in and counter to said direction.

4. The apparatus of claim 3, wherein said moving means includes means for superimposing upon said member a movement about a fixed axis during movement of said member in and counter to said direction.

5. The apparatus of claim 4, further comprising common prime mover means for said transporting means and said moving means.

6. The apparatus of claim 3, wherein said moving means comprises a crank and rocker mechanism including a pivotable component operatively connected with said member.

7. The apparatus of claim 1, wherein said shifting means comprises an actuating element movable to and from an operative position of engagement with said tool, means for moving said element to and from said operative position, and means for moving said element in said operative position to thereby shift said tool substantially at right angles to said direction.

8. The apparatus of claim 7, wherein said means for moving said actuating element to and from said operative position comprises an electromagnet.

9. The apparatus of claim 1, wherein said first path extends along a plane at least through that region which is flanked by said trajectories; and wherein said second path extends along said plane so that said trajectories are parallel to said plane.

10. A dispenser for sheet-like carriers of information, comprising a source of interconnected separable carriers; a housing having an outlet; means for transporting successive carriers from said source toward said outlet at a predetermined speed and in a predetermined direction along a first path; means for applying legible information to successive carriers moving along a first portion of said path; and an apparatus for making holes in successive carriers moving along a second portion of said path, including a matrix disposed at one side of said second portion, a perforating tool disposed at the other side of said second portion opposite said matrix; holder means for said tool and said matrix, means for moving said holder means with said tool and said matrix in and counter to said direction along an arcuate second path which is so oriented relative to said first path that said tool and said matrix move along trajectories which maintain their respective distances from the carrier transported in said second portion of said first path, and at a varying speed so that, during a predetermined interval of movement of said holder means in said direction, the speed of said tool and said matrix at least closely approximates said predetermined speed, and means for shifting said tool substantially at right angles to its trajectory and to said direction toward said matrix to thereby perforate the carrier portion in said second portion of said first path during selected intervals of movement of said holder means in said direction.

11. The dispenser of claim 10, further comprising processing means for operating said shifting means during said selected intervals.

12. The dispenser of claim 11, wherein said processing means comprises computer means arranged to actuate said transporting means and said means for applying legible information.

13. The dispenser of claim 10, wherein said means for applying legible information is a matrix printer.

14. Apparatus for making holes in a sheet-like carrier of information, comprising a stationary support; means for transporting the carrier at a predetermined speed and in a predetermined direction along a first path; a matrix disposed at one side of said path; a perforating tool disposed at the other side of said path opposite said matrix; holding means for said tool and said matrix, including a substantially plate-like member and a parallel motion mechanism connecting said member to said support so that said member is movable in and counter to said direction and including two substantially parallel springy arms each having a first end portion secured to said support and a second end portion secured to said member; means for moving said holder means with said tool and said matrix in and counter to said direction along an acruate second path and at a varying speed so that, during a prdetermined interval of movement of said holder means in said direction, the speed of said tool and said matrix at least closely approximates said predetermined speed, said first path being substantially tangential to said second path; and means for shifting said tool substantially at right angles to said direction toward said matrix to thereby perforate the carrier portion between said matrix and said tool during selected intervals of movement of said holder means in said direction.

15. Apparatus for making holes in a sheet-like carrier of information, comprising a stationary support; means for transporting the carrier at a predetermined speed and in a predetermined direction along a first path; a matrix disposed at one side of said path; a perforating tool disposed at the other side of said path opposite said matrix; holder means for said tool and said matrix, including a substantially plate-like member and a parallel motion mechanism connecting said member to said support so that said member is movable in and counter to said direction; means for moving said holder means with said tool and said matrix in and counter to said direction along an arcuate second path and at a varying speed so that, during a predetermined interval of movement of said holder means in said direction, the speed of said tool and said matrix at least closely approximates said predetermined speed, said first path being substantially tangential to said second path, said moving means including a twin parallel motion mechanism mounted on said member and supporting said tool for movement toward and away from said matrix and means for shifting said tool substantially at right angles to said direction toward said matrix to thereby perforate the carrier portion between said matrix and said tool during selected intervals of movement of said holder means in said direction.

16. The apparatus of claim 15, wherein said first mentioned parallel motion mechanism comprises two substantially parallel springy arms connecting said member to said support and said twin parallel motion mechansim is disposed between said arms.

17. Apparatus for making holes in a sheet-like carrier of information, comprising means for transporting the carrier at a predetermined speed and in a predetermined direction along a first path; a matrix disposed at one side of said path; a perforating tool disposed at the other side of said path opposite said matrix; holder means for said tool and said matrix; a twin parallel mortion mechanism supporting said tool on said holder means for movement toward and away from said matrix and including a centrally located first area having a first end portion supporting said tool and a second end portion, means for coupling said second end portion to said holder means, and two outer arms flanking said first arm, said outer arms having first end portions connected with the second end portion of said first arm and second end portions connected with said holder means; means for moving said holder means with said tool and said matrix in and counter to said direction along an acruate second path and at a varying speed so that, during a predetermined interval of movement of said holder means in said direction, the speed of said tool and said matrix at least closely approximates said predetermined speed, said first path being substantially tangential to said second path; and means for shifting said tool substantially at right angles to said direction toward said matrix to thereby perforate the carrier portion between said matrix and said tool during selected intervals of movement of said holder means in said direction.

18. The apparatus of claim 17, wherein said outer arms consist of springy material.

19. The apparatus of claim 18, wherein said first arm is integral with said outer arms.

* * * * *